United States Patent
Doshin

(10) Patent No.: US 9,560,251 B2
(45) Date of Patent: Jan. 31, 2017

(54) IMAGE PICKUP APPARATUS

(71) Applicant: CANON KABUSHIKI KAISHA, Tokyo (JP)

(72) Inventor: Katsuhiro Doshin, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/840,224

(22) Filed: Aug. 31, 2015

(65) Prior Publication Data
US 2016/0072992 A1 Mar. 10, 2016

(30) Foreign Application Priority Data
Sep. 10, 2014 (JP) ................. 2014-183950

(51) Int. Cl.
H04N 5/225 (2006.01)

(52) U.S. Cl.
CPC .......... H04N 5/2256 (2013.01); H04N 5/2251 (2013.01); H04N 5/2252 (2013.01)

(58) Field of Classification Search
CPC .. H04N 5/2251; H04N 5/2252; H04N 5/2256; G03B 15/05
See application file for complete search history.

(56) References Cited

U.S. PATENT DOCUMENTS

| | | | | |
|---|---|---|---|---|
| 2001/0040622 A1* | 11/2001 | Maruyama | ............. | G03B 17/48 348/64 |
| 2004/0071459 A1* | 4/2004 | Ujikane | ................. | G03B 15/03 396/178 |
| 2005/0258825 A1* | 11/2005 | Masuda | ................. | G01D 5/145 324/207.26 |
| 2009/0103911 A1* | 4/2009 | Ikemizo | ................. | G03B 15/05 396/174 |
| 2011/0188848 A1* | 8/2011 | Sotsu | ..................... | G03B 17/00 396/542 |
| 2012/0182465 A1* | 7/2012 | Lin | ....................... | H04N 5/2256 348/371 |
| 2013/0259461 A1* | 10/2013 | Yoon | ...................... | G03B 15/05 396/165 |
| 2015/0212392 A1* | 7/2015 | Man | ....................... | G03B 15/05 362/18 |

FOREIGN PATENT DOCUMENTS

JP 2008180747 A * 8/2008
JP 2009-116321 A 5/2009

* cited by examiner

Primary Examiner — Timothy J Henn
(74) Attorney, Agent, or Firm — Fitzpatrick, Cella, Harper & Scinto

(57) ABSTRACT

A light-emitting-part holder moves between a housing position in which the light-emitting-part holder is housed in a housing part formed in a strobe base and a light emission position in which the light-emitting-part holder projects from the housing part. One end of an arm member is supported by the light-emitting-part holder, and the other end thereof is supported by the strobe base. An arm cover member holds a magnet, and in a case where the arm member is housed in the housing part, the arm cover member is fixed to the face of the arm member facing the housing part. A part of a light-emitting-part flexible board (flexible wire member) is disposed between the magnet held by the arm cover member and the arm member.

3 Claims, 7 Drawing Sheets

IMAGE PICKUP APPARATUS

BACKGROUND OF THE INVENTION

Field of the Invention

The invention relates to an image pickup apparatus such as a digital camera which includes a movable flash light emission unit.

Description of the Related Art

Some small-sized digital cameras having a large-diameter lens barrel include a pop-up-type strobe unit for the purpose of preventing so-called "vignetting" in which strobe light is blocked at a front edge of the lens barrel and does not reach a subject. Such a pop-up-type strobe unit has a movable member having a strobe light emission unit which moves between a housing position at which the movable member is inside a camera body part and a light emission position at which the movable member projects from the camera body part. As a mechanism which moves the movable member from the housing position inside the camera body part to the light emission position, there is a pop-up mechanism which uses two rotation shafts, which has an advantage that a housing space of the movable member can be smaller in response to demands for small-sized cameras. With the mechanism using the two rotation shafts, the strobe light emission unit is moved to a subject side in the optical axis direction of the lens barrel in addition to a camera-height direction, and to thereby avoiding the vignetting while suppressing an amount of pop-up.

As a contact-type means for detecting a light emission position of the strobe light emission unit, a push switch or the like is used. In this contact type, the switch is pressed when the strobe light emission unit is in a housing position and in an ON state, and thus the unit is controlled to be in a non-light-emissive state. In addition, when the strobe light emission unit is in a light emission position, it is separated from the switch and in an OFF state, and thus is controlled to be in a light emissive state. However, with respect to such a contact-type detection switch, there is generally a limit on timings at which ON and OFF states are switched when a position of the strobe light emission unit is detected. That is to say, a case in which, in the course of moving the strobe light emission unit from the housing position to the light emission position in such a pop-up mechanism that uses two rotation shafts, the movement is stopped by a photographer or the like is assumed. In this case, there is a possibility of the detection switch switching to the OFF state and the unit being switched to the light emissive state even when the strobe light emission unit does not project from the camera body part. For this reason, so-called "burning" occurs in the camera body part.

On the other hand, as a non-contact-type means for detecting a light emission position of a strobe light emission unit, a magnet and a magnetic sensor are used (refer to Japanese Patent Laid-Open No. 2009-116321). In the non-contact-type detection method, changes in a distance between the magnet and the magnetic sensor in a housing position and a light emission position of the strobe light emission unit are detected. For example, when the strobe light emission unit is in the housing position, the magnetic sensor included in the camera body part comes close to the magnet included in the strobe light emission unit, and thus the unit switches to an ON state and is controlled to be in a non-light-emissive state. In addition, when the strobe light emission unit is in the light emission position, the magnetic sensor and the magnet are separated from each other, and the unit switches to an OFF state, and is controlled to be in a light emissive state.

In the related art disclosed in Japanese Patent Laid-Open No. 2009-116321, a magnet is disposed inside a strobe case near a strobe light emission unit in a pop-up-type strobe unit which uses two rotation shafts. Thus, when the distance between the strobe light emission unit and a magnetic sensor is excessively long, a detection signal turns off before the strobe light emission unit projects from a camera body part, resulting in a light emissive state. That is to say, when a movement of the strobe light emission unit from the housing position to the light emission position is stopped by a photographer in the course of the movement, the state becomes a detection-off state even though strobe light is being radiated to the inside of the camera body part, and is switched to a light emissive state. Therefore, there is a possibility of burning occurring in the camera body part. In addition, there is a method of delaying a timing at which a detection signal of a magnetic sensor turns off by raising sensitivity of the magnetic sensor. In this case, there is a possibility of an erroneous detection occurring due to another magnetized metal component or the like.

Therefore, it is desirable to increase the size of a magnet and bring the magnet and a magnetic sensor close to each other in a housing state of a strobe light emission unit. If a distance between the magnet and the magnetic sensor can be shortened in the housing state, a degree of freedom in disposing the magnetic sensor also increases.

SUMMARY OF THE INVENTION

The invention improves accuracy in detecting a position of a light emission unit of an image pickup apparatus which has the light emission unit that moves between a housing position and a light emission position.

According to the invention, image pickup apparatus that includes a light emission unit which holds a light emitting part and moves between a housing position at which the light emission unit is housed in a housing part formed in a base member and a light emission position at which the light emission unit projects from the housing part is provided that includes an arm member, one end of which is pivotally supported by the light emission unit and the other end of which is pivotally supported by the base member; a circuit board that is disposed inside the image pickup apparatus; a flexible wire member that connects the light emitting part and the circuit board; a holding member that holds a magnet and is fixed to the arm member; a magnetism detection unit that is provided inside the image pickup apparatus and detects magnetism of the magnet; and a control unit that controls light emission of the light emitting part based on an output of the magnetism detection unit, wherein the holding member is fixed to a surface facing the housing part in a case where the arm member is housed in the housing part, and wherein a part of the flexible wire member is disposed between the magnet held by the holding member and the arm member.

According to the invention, in the image pickup apparatus which includes the light emission unit that moves between the housing position and the light emission position, accuracy in detecting a position of the light emission unit can be improved.

Further features of the present invention will become apparent from the following description of exemplary embodiments with reference to the attached drawings.

DESCRIPTION OF THE EMBODIMENTS

Hereinafter, an embodiment of the invention will be described in detail with reference to the attached drawings. As an image pickup apparatus according to the embodiment, a digital camera will be illustrated. It should be noted that positional relations of respective units will be described with a subject side defined as a front side.

Figure 1A:
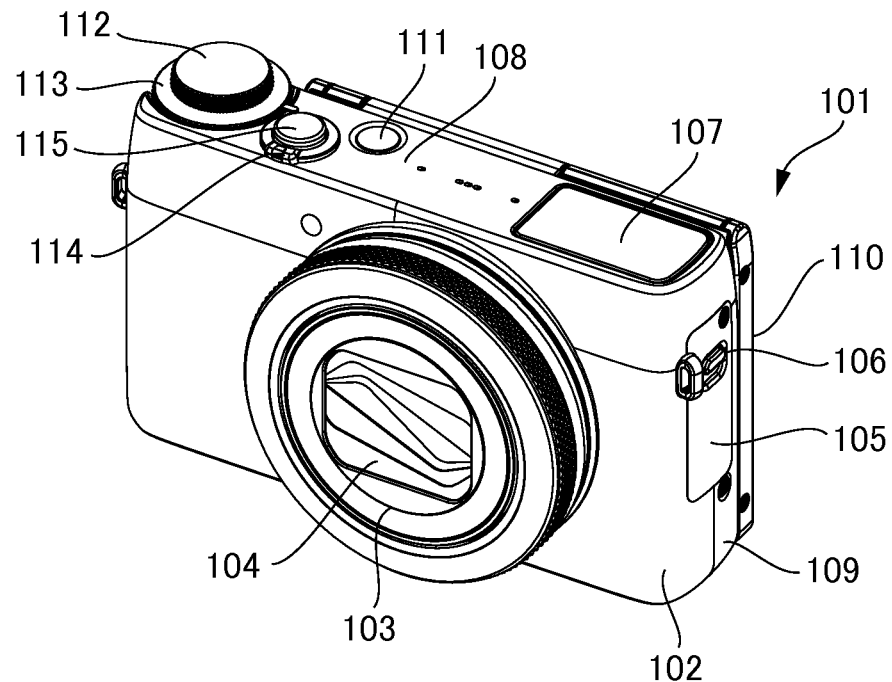
FIGS. 1A and 1B are perspective views of an image pickup apparatus according to an embodiment of the invention.
Figure 1B:
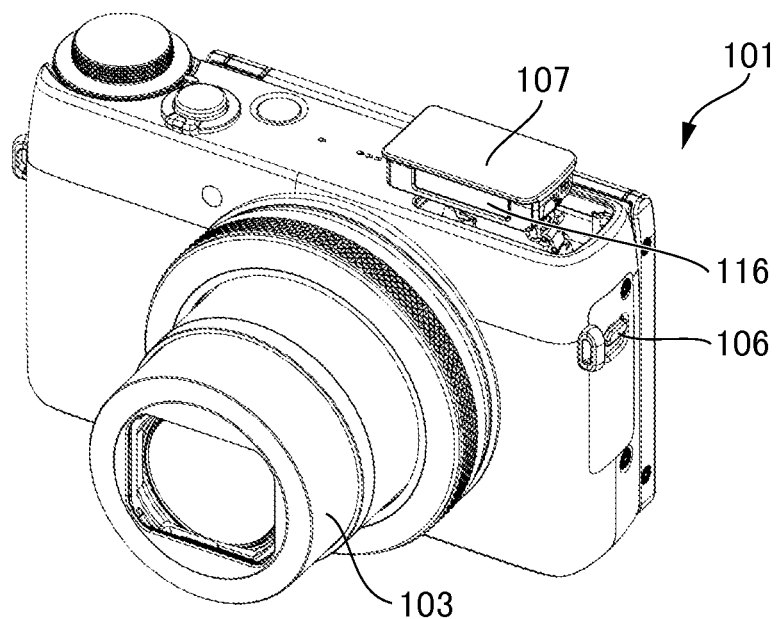

FIGS. 1A and 1B are perspective views illustrating the image pickup apparatus 101 from the front side. FIG. 1A illustrates a state in which a strobe unit 107 is in a housing position at which the strobe unit 107 is housed inside the image pickup apparatus 101 in a power-off state. FIG. 1B illustrates a pop-up state in which the strobe unit 107 is in a light emission position at which the strobe unit 107 projects from the image pickup apparatus 101 in a power-on state (or an imaging possible state).

A front cover unit 102 and a lens barrel unit 103 are disposed on the front side of the image pickup apparatus 101. A lens barrier 104 is incorporated into the lens barrel unit 103, and the lens barrier 104 is in a closed state at the housing position. A side cover unit 105 is incorporated in a side part of the image pickup apparatus 101. A strobe lever 106 is disposed in the side cover unit 105. The strobe unit 107 having a light emission unit 301 (see FIG. 3) and a top cover unit 108 that is an exterior member are disposed in a top part of the image pickup apparatus 101. A rear cover unit 109 and a tilt liquid crystal unit 110 are disposed on a back side of the image pickup apparatus 101.

The internal structure of the image pickup apparatus 101 is covered by the front cover unit 102, the side cover unit 105, the top cover unit 108, the rear cover unit 109, and a jack cover unit and a bottom cover neither of which is illustrated. A power button 111, a mode dial 112, an exposure dial 113, a zoom lever 114, and a release button 115 are disposed in the top cover unit 108. When a photographer presses the power button 111, the lens barrier 104 is opened, the lens barrel unit 103 is drawn out to the front, and thus the device is in a power-on state (or imaging possible state) shown in FIG. 1B.

The strobe unit 107 which includes a light emitting part 116 is pivotally supported by a shaft (not illustrated) that is provided in the device body part of the image pickup apparatus 101, and can rotate with respect to the shaft. When the photographer presses down the strobe lever 106, the strobe unit 107 rotates so that the light emitting part 116 is exposed to the outside, and thus is in the pop-up state. A control unit (not illustrated) of the image pickup apparatus 101 determines brightness of a subject in the pop-up state of the strobe unit 107. When a subject is determined to be dark, the light emitting part 116 emits an amount of light corresponding to the brightness of the subject. Even when the strobe unit 107 is at the light emission position, the photographer can arbitrarily select light emission or non-light-emission of the light emitting part 116. The strobe unit 107 at the light emission position can return to the housing position when the photographer manually presses the strobe unit 107 down to the device main body side.

Figure 2:
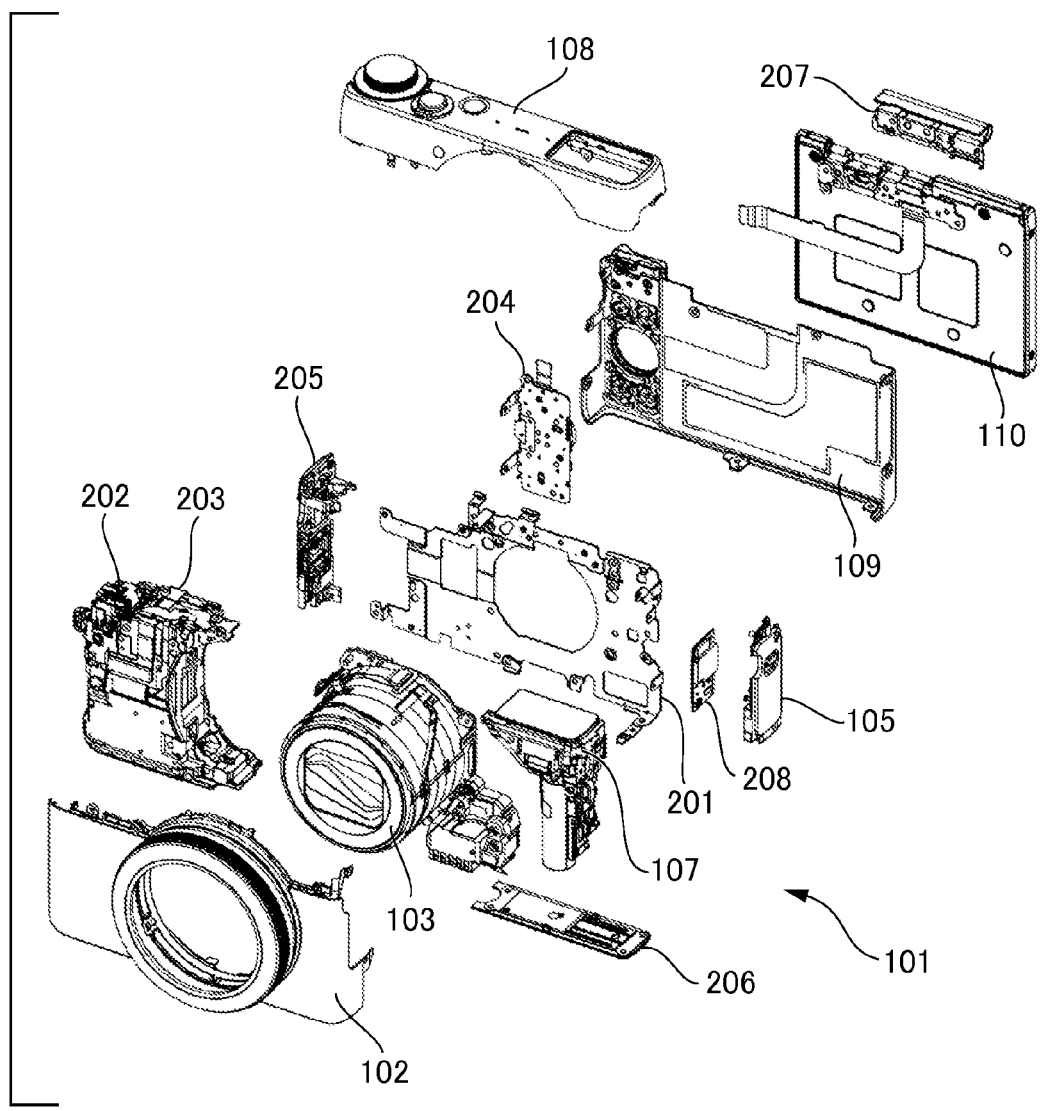
FIG. 2 is an exploded perspective view of the image pickup apparatus according to the embodiment.

Next, a configuration of the image pickup apparatus 101 will be described in detail with reference to FIG. 2. FIG. 2 is an exploded perspective view of the image pickup apparatus 101. The device body part of the image pickup apparatus 101 includes a main chassis 201 that is a main structure configured to hold all of the units. The main chassis 201 holds the lens barrel unit 103 fastened on the front side using screws. In addition, the main chassis 201 holds a battery box unit 202. The battery box unit 202 holds a main board 203.

The main chassis 201 holds a jog dial unit 204, the rear cover unit 109, the tilt liquid crystal unit 110, and a hinge cover 207 on its back side. The jack cover unit 205 is fastened with screw (not illustrated) on the side surface of the battery box unit 202 side the jog dial unit 204.

The main chassis 201 holds the top cover unit 108 on the top face side of the image pickup apparatus 101. In addition, a bottom cover 206 is fastened to the main chassis 201 and the battery box unit 202 with screws (not illustrated) on the bottom surface side of the image pickup apparatus 101. The strobe unit 107 is fastened to the main chassis 201 with screws (not illustrated). The main chassis 201 holds a wireless module board 208 and the side cover unit 105 on the side surface of the strobe unit 107 side.

Figure 3:
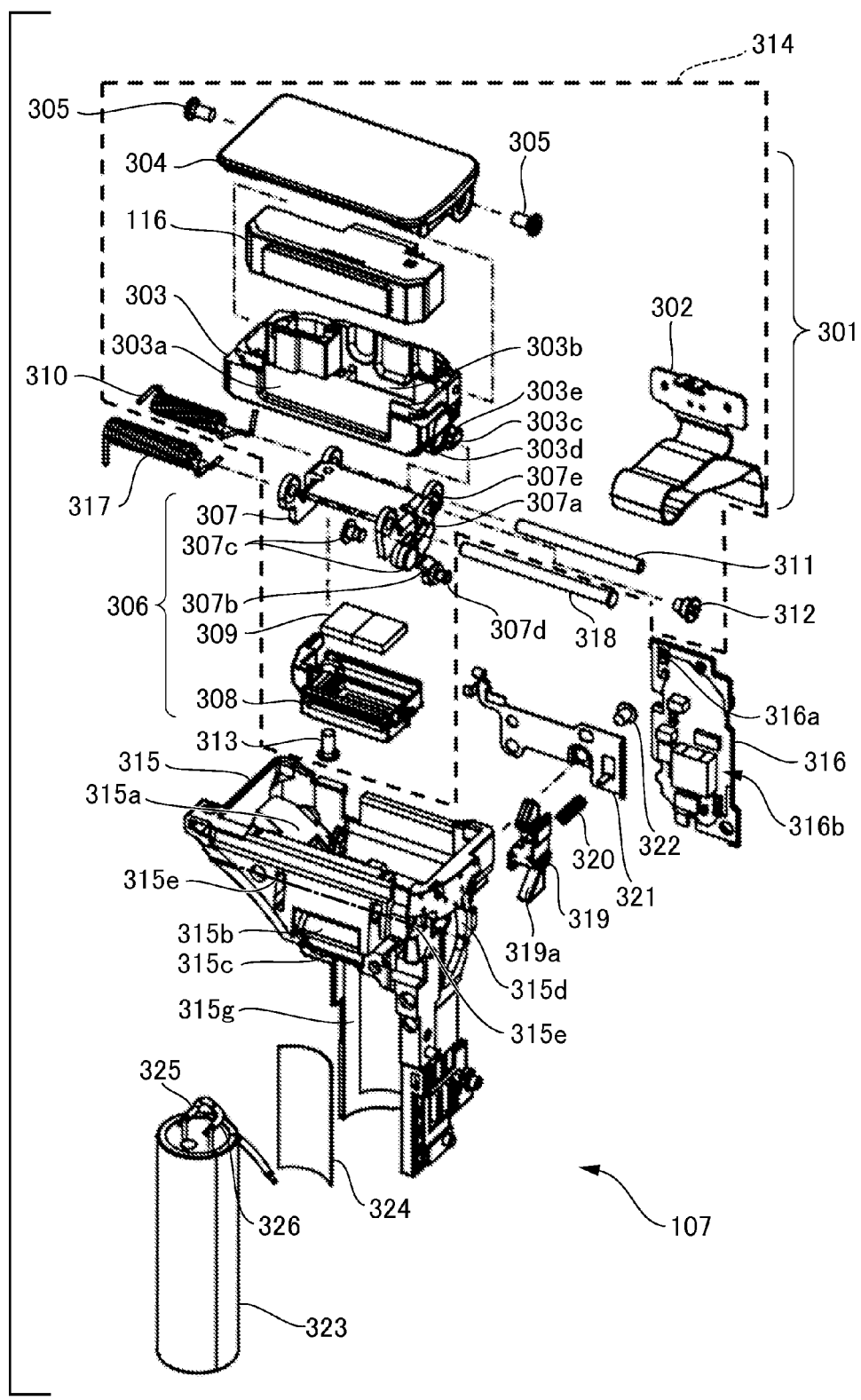
FIG. 3 is an exploded perspective view of a strobe unit according to the embodiment.

FIG. 3 is an exploded perspective view of the strobe unit 107. The strobe unit 107 has a light emission unit 301. The light emission unit 301 comprises the light emitting part 116, a light-emitting-part flexible printed board (flexible wire member) 302, a light-emitting-part holder 303, and a light-emitting-part cover 304. The light-emitting-part flexible printed board (hereinafter referred to as a light-emitting-part flexible board) 302 is a wire member which connects the light emitting part 116 and a circuit board (strobe board 316) that will be described below.

The light emitting part 116 is constituted by a Xe (xenon) tube, a reflective umbrella, a light-emitting-part window, and a trigger coil. With the reflective umbrella and the light-emitting-part window, a light distribution angle is decided so that strobe light is concentrated on a region to be captured (hereinafter referred to as an angle of view of photographing). That is to say, efficiency of light concentration can be heightened by causing light to concentrate on the field of the subject within the angle of view of photographing using the reflective umbrella and the light-emitting-part window. The light emitting part 116 is provided with the Xe tube that extends from the light emitting part 116 for application of a voltage and an input terminal (not illustrated) of the trigger coil. The input terminal is connected to the light-emitting-part flexible board 302 through soldering.

The light-emitting-part holder 303 houses the light emitting part 116 inside a housing part 303a. An insertion opening 303b through which the light-emitting-part flexible board 302 is drawn out is formed on the rear side of the housing part 303a. The light emitting part 116 is housed in the housing part 303a in a state in which the light-emitting-part flexible board 302 is inserted into the insertion opening 303b of the light-emitting-part holder 303. The light emitting part 116 is cased by covering the light-emitting-part holder 303 in which the light emitting part 116 is housed with the light-emitting-part cover 304 from above. The light-emitting-part cover 304 is fixed to the light-emitting-part holder 303 by being fastened with screws 305 from sides. Accordingly, assembly of the light emission unit 301 is completed.

An arm part 306 is assembled with the light emission unit 301. The arm part 306 includes an arm member 307, an arm cover member (holding member) 308, and a magnet (permanent magnet) 309. The arm member 307 is formed of a soft magnetic material such as iron. The arm cover member 308 is formed of a synthetic resin material which transmits magnetism. A link mechanism for regulating an upper or lower light distribution direction of the light emission unit 301 is assembled in the strobe unit 107. A first link member A 307a and a second link member B 307b constituting the link mechanism are each caulked and held to the arm member 307 by link pins 307c. A follower pin 307d is caulked and held on the opposite side to the side on which the second link member B 307b is caulked and held.

A pair of bearings 303c are provided on the bottom surface at the rear side of the light-emitting-part holder 303. The arm member 307 is installed to the pair of bearings 303c via a first spring 310 and a first rotation shaft 311 so as to freely rotate. That is to say, one end of the arm member 307 is pivotally supported by the light-emitting-part holder 303. A link screw fastening hole part 303d is provided on the bottom surface of one side of the light-emitting-part holder 303. The link screw fastening hole part 303d is fastened with a screw fastening part 307e provided in the first link member A 307a of the arm member 307 using a link screw 312.

The first spring 310 urges the light emission unit 301 in a direction in which the light emission unit projects from the device body part of the image pickup apparatus 101. That is to say, the first spring 310 is an urging member which urges the light-emitting-part holder 303 toward the light emission position from the arm member 307. The arm cover member 308 covering the light-emitting-part flexible board 302 is installed in the arm member 307 so that the light-emitting-part flexible board 302 is not exposed in the pop-up state in which the light emission unit 301 is in the light emission position. The magnet 309 is housed in the arm cover member 308 in a state of being positioned with high accuracy and fixed by an adhesive. Then, the arm cover member 308 is fixed to the arm member 307 by a screw 313, and assembly of a light-emitting-part arm unit 314 is completed. That is to say, the arm cover member 308 is fixed to the surface facing a housing part 315a among the arm member 307 when the arm member 307 is housed in the housing part 315a. Then, a part of the light-emitting-part flexible board 302 is disposed between the magnet 309 held by the arm cover member 308 and the arm member 307. Note that, even in the state in which the arm cover member 308 is fixed to the arm member 307, a space necessary for movement of the light-emitting-part flexible board 302 is secured.

The light-emitting-part arm unit 314 is housed in the housing part 315a that is formed as a concave portion in an upper part of the strobe base 315 that is a base member. Insertion openings 315b and 315c are formed on a front surface of the strobe base 315 that is formed of a synthetic resin material. The insertion openings 315b and 315c are used to draw and send the light-emitting-part flexible board 302 toward the strobe board 316 disposed on the rear side of the strobe base 315. The strobe board 316 is a circuit board for controlling light emission of the light emitting part 116.

When the light-emitting-part arm unit 314 is housed in the housing part 315a of the strobe base 315, the light-emitting-part flexible board 302 is passed to the insertion opening 315b and the light-emitting-part flexible board 302 remains drawn out to the front face of the strobe base 315. Then, the arm member 307 is installed rotatably to a pair of bearings 315e provided on the strobe base 315 via a second spring 317 and a second rotation shaft 318. That is to say, the other end of the arm member 307 is rotatably supported by the strobe base 315. At this time, the follower pin 307d provided in the second link member B 307b goes into a cam groove part 315d of the strobe base 315. Accordingly, when the strobe unit 107 performs a pop-up operation, the follower pin 307d moves along the cam groove part 315d, and thus rotation of the light emission unit 301 during the pop-up operation can be regulated. In other words, rotation of the light emission unit 301 is regulated by the first link member A 307a, the second link member B 307b, and the cam groove part 315d.

The pair of bearings 315e are disposed on an upper side in the height direction of the image pickup apparatus 101 and a front side in the front-rear direction of the image pickup apparatus 101, and thus the device has an advantage with respect to vignetting of strobe light. In other words, the pair of bearings 315e are disposed directly below the top cover unit 108 which constitutes the exterior unit. The second spring 317 urges the light emission unit 301 in the direction in which the light emission unit projects from the device body part of the image pickup apparatus 101.

Then, an operation that the light-emitting-part flexible board 302 is bent 180 degrees and is passed through the insertion opening 315c is performed. By drawing and sending the light-emitting-part flexible board 302 to the strobe board 316 that is fixed to the rear side of the strobe base 315, the board is connected to a connector (not illustrated) disposed in the strobe board 316. With the above configuration, it is possible to suppress exposure of a portion of the light-emitting-part flexible board 302 to the minimum even in the pop-up state in which the light emission unit 301 is in the light emission position. The light-emitting-part flexible board 302 can be connected to the strobe board 316 that is disposed in the rear side of the strobe base 315.

A magnetic sensor 316a is mounted on the strobe board 316, which serves as a magnetism detection unit that detects magnetism of the magnet 309 that is fixed to the arm cover member 308. The magnetic sensor 316a outputs a signal according to a distance to the magnet 309, and the output signal is input to a control unit 316b which controls switching of the light emission unit 301 to a non-light-emissive state or a light emissive state. That is to say, the control unit 316b performs control of light emission of the light emission unit 301 based on an output of the magnetic sensor 316a. Note that the switching control by the control unit 316b will be described below.

In the strobe base 315, a strobe engagement member 319 for holding the light emission unit 301 in the housing state is assembled. The strobe engagement member 319 is supported by the strobe base 315 in a slidable state. The strobe engagement member 319 has a slope 319a, and is urged by a spring 320, a strobe engagement holding member 321, and a screw 322 at all times. Since the strobe engagement member 319 is urged by the spring 320, the strobe engagement member 319 is engaged with an engagement reception part 303e of the light-emitting-part holder 303 at all times during housing of the light emission unit 301, and thus the light emission unit 301 is held in the housing state.

In a lower part 315g of the strobe base 315, a capacitor 323 is fixed with a double-sided tape 324. The capacitor 323 has a pair of a lead wire (+) 325 and a lead wire (−) 326 soldered thereto. The lead wires are soldered onto the strobe board 316 at spots that are not illustrated to be electrically connected to the strobe board.

Figure 4A:
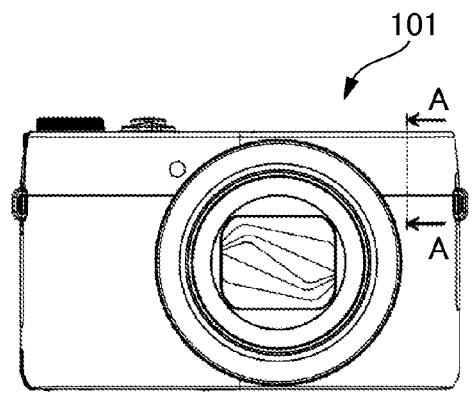
FIG. 4A is a front view of the image pickup apparatus according to the embodiment.
Figure 4B:
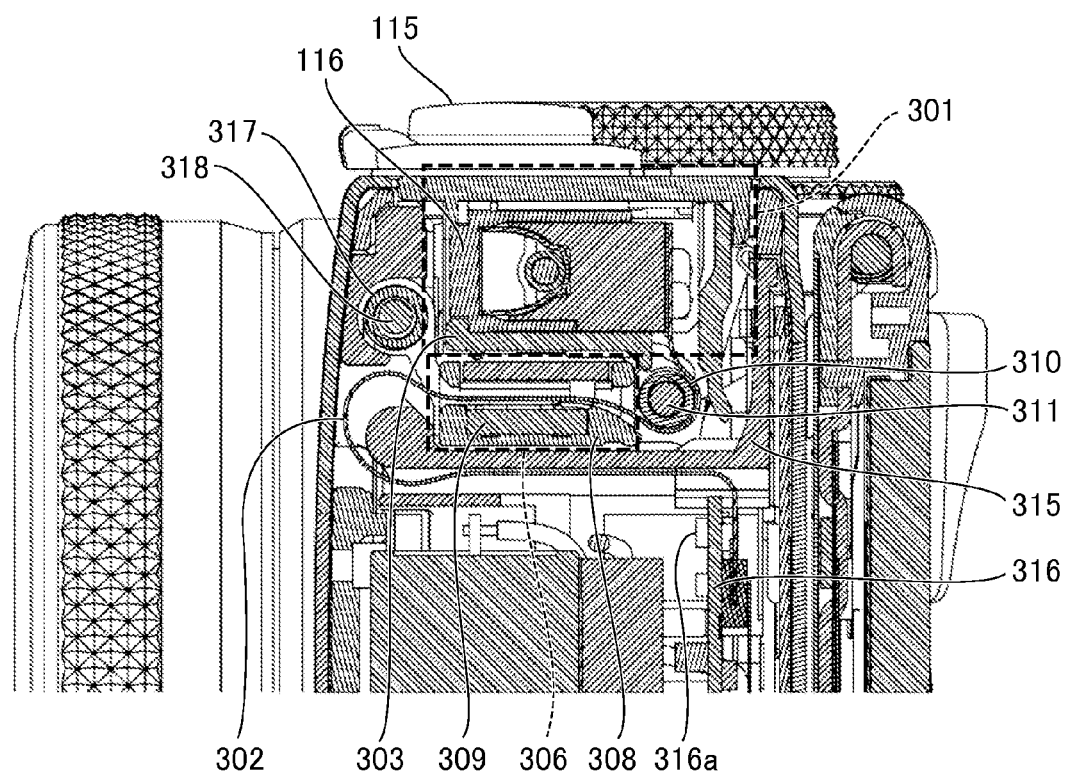
FIG. 4B is a cross-sectional view cut along the line A-A of the image pickup apparatus according to the embodiment.
Figure 5A:
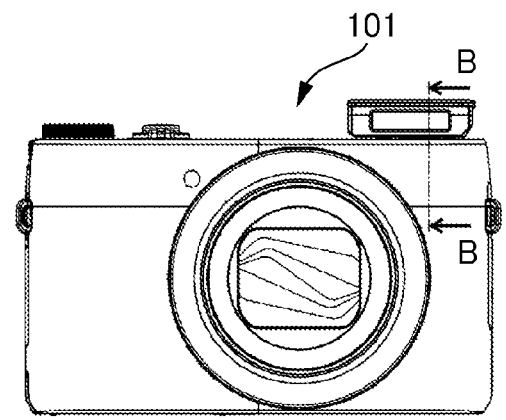
FIG. 5A is a front view illustrating the strobe unit during rotating according to the embodiment.
Figure 5B:
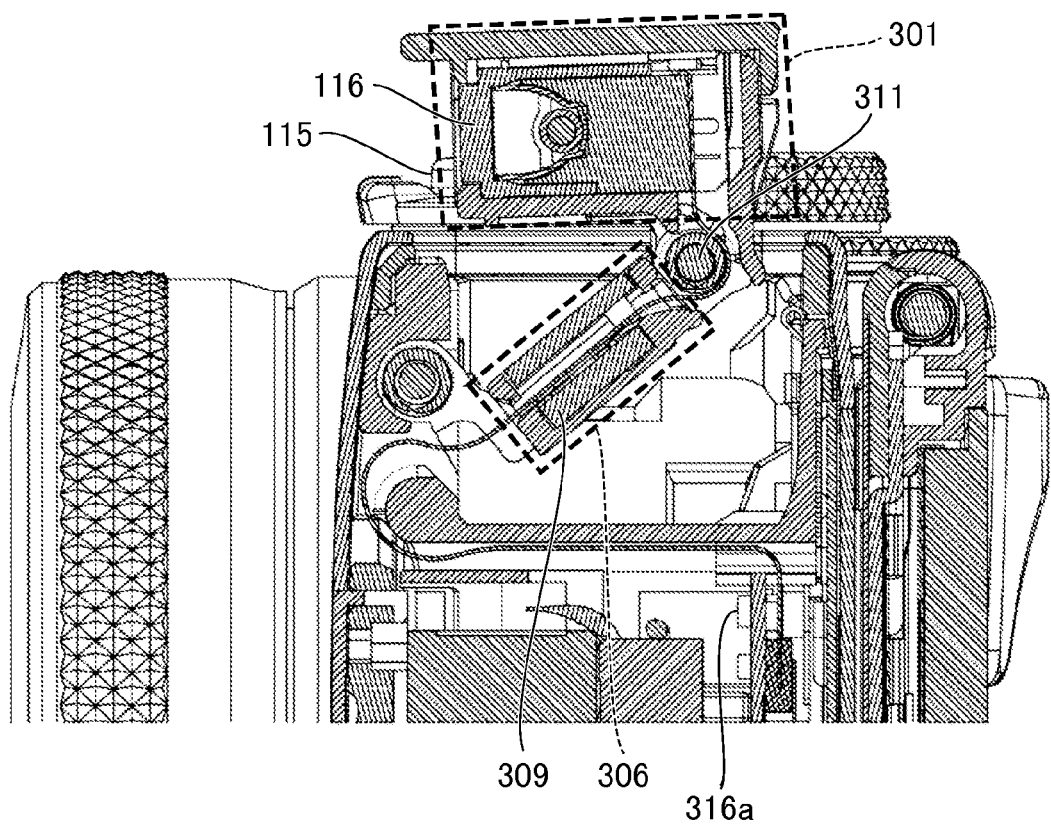
FIG. 5B is a cross-sectional view cut along the line B-B of the strobe unit during rotating according to the embodiment.
Figure 6A:
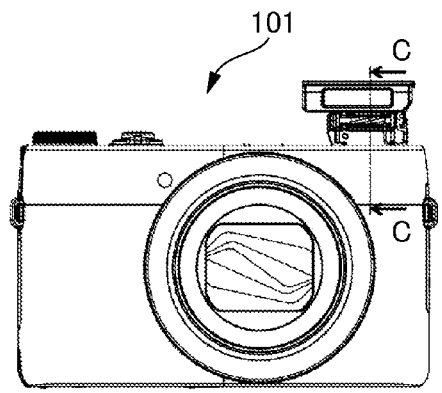
FIG. 6A is a front view illustrating the strobe unit in a light emission position according to the embodiment.
Figure 6B:
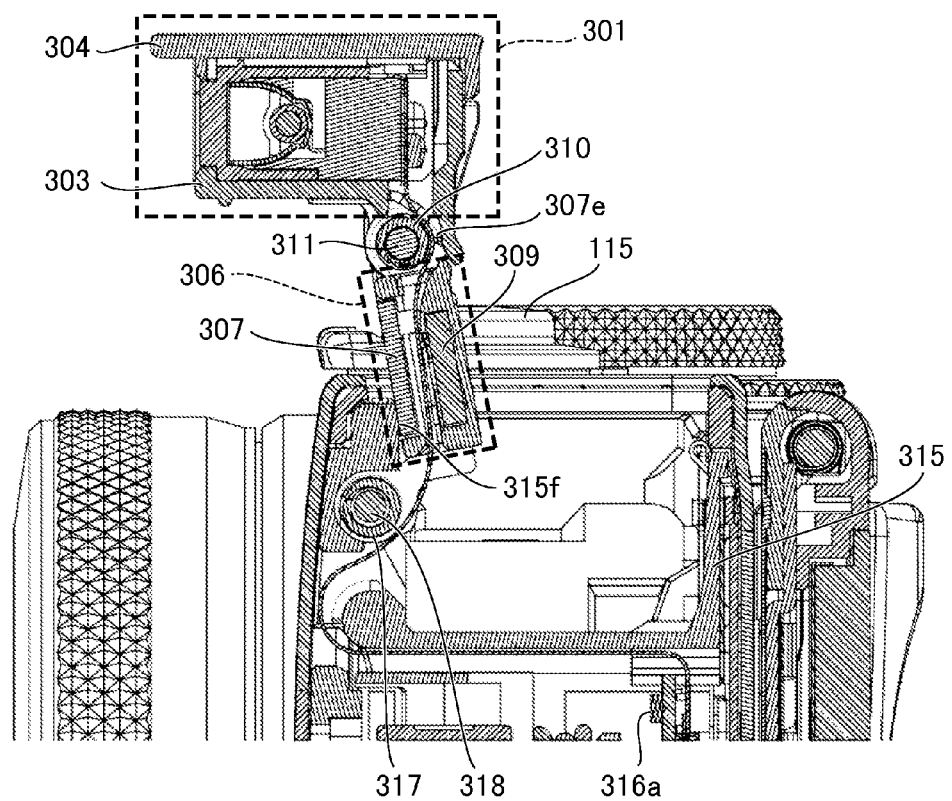
FIG. 6B is a cross-sectional view cut along the line C-C of the strobe unit in the light emission position according to the embodiment.

FIG. 4A is a front view of the image pickup apparatus 101. FIG. 4B is an A-A cross-sectional view cut along the line A-A of FIG. 4A, illustrating a positional relation between the magnet 309 and the magnetic sensor 316a in the housing state of the light emission unit 301. FIG. 5A is a front view of the image pickup apparatus 101 when the strobe unit 107 is in the middle of a pop-up operation. FIG. 5B is a cross-sectional view cut along the line B-B of FIG. 5A, illustrating a positional relation between the magnet 309 and the magnetic sensor 316a when the light emission unit 301 is switched from the non-light-emissive state to a light emissive state. FIG. 6A is a front view of the image pickup apparatus 101 in the light emission position in which the strobe unit 107 projects from the device body part. FIG. 6B is a cross-sectional view cut along the line C-C of FIG. 6A, illustrating a positional relation between the magnet 309 and the magnetic sensor 316a in a state in which the light emission unit 301 pops up to the light emission position.

For the magnet 309, a permanent magnet such as a samarium-cobalt rare-earth magnet or a neodymium rare-earth magnet having strong magnetism is used. The magnetic sensor 316a is an element which detects magnetism, and a giant magnet resistance (GMR) element, a semiconductor Hall element, or the like is generally used. The GMR element is a device which detects a magnetic field that is parallel to a main surface using a magneto-resistance effect, and includes an alloy having a property in which electric resistance increases as a magnetic field becomes stronger (specifically, the alloy has main components such as nickel, iron, and cobalt). Using such the GMR element, a GMR sensor is constituted by incorporating a determination circuit therein. For example, when a threshold value of density of a magnetic flux that penetrates a GMR sensor is set and a sensor output value exceeds the threshold value, a L (low) signal ('ON' signal) is output, and when the output value is equal to or lower than the threshold value, a H (high) signal ('OFF' signal) is output.

A Hall element is a device which detects a magnetic field perpendicular to the main surface using a Hall effect. Using such the Hall element, a Hall sensor is constituted by incorporating a determination circuit therein. For example, when a threshold value of density of a magnetic flux which penetrates the Hall sensor is set and a sensor output value exceeds the threshold value, the L signal ('ON' signal) is output, and when the output value is equal to or lower than the threshold value, the H signal ('OFF' signal) is output. In this manner, it is necessary to appropriately distinguish the uses of the magnetic sensor 316a by taking a direction of a detectable magnetic flux with respect to the main surface into consideration.

The strobe engagement member 319 is engaged with the engagement reception part 303e of the light-emitting-part holder in the strobe housing state illustrated in FIG. 4B, and thus the light emission unit 301 of the strobe unit 107 is held in the housing position. The arm cover member 308 that is fixed to the magnet 309 through bonding in this state is a holding member disposed in the lowermost part of the housing part 315a of the strobe base 315. Thus, the magnet 309 and the magnetic sensor 316a can be brought as close as possible to each other, and thus a detected voltage value of the magnetic sensor 316a reaches its peak. In the housing position, the first rotation shaft 311 and the magnet 309 are disposed at substantially the same height in the axis direction of the first rotation shaft 311 and the height direction orthogonal to the optical axis direction. A part of the light-emitting-part flexible board 302 extends in the height direction between the arm member 307 and the magnet 309, and the magnet 309 is positioned on the lower side thereof, i.e., on the magnetic sensor 316a side.

In addition, in the strobe housing state illustrated in FIG. 4B, the light-emitting-part flexible board 302 is drawn and bent 180 degrees, and thereby the magnet 309 is in a disposition in which it is sandwiched in the space formed by the light-emitting-part flexible board 302. In order to prevent cutting or the like caused by the flection of the light-emitting-part flexible board 302, a space for drawing and sending the wire member with a predetermined curvature R or higher is necessary. That is to say, since the magnet 309 is disposed in the space formed on the inner side portion of the light-emitting-part flexible board 302 that is bent 180 degrees, the size of the strobe unit 107 does not increase due to the magnet 309.

In a pop-up-type strobe configuration of the related art, it is necessary for the light-emitting-part flexible board 302 to be slack during housing of the strobe unit 107 in order to give an extra length of the light-emitting-part flexible board 302, and thus there is a possibility of the space in which the magnet 309 is to be disposed being unable to be sufficiently secured. In contrast, since the link mechanism is installed in the present embodiment, the extra length of the light-emitting-part flexible board 302 can be set to be shorter than in the related art, and thus a space for disposing the magnet 309 can be secured.

The thin concave portion in which the magnet 309 is housed is formed in the arm cover member 308. By fixing the rigid-body magnet 309 to the concave portion of the arm cover member 308, miniaturization of the strobe unit 107 can be realized without impairing strength of the arm cover member 308.

In the strobe housing state illustrated in FIG. 4B, the distance between the magnet 309 and the magnetic sensor 316a is a short distance at which they are in closest proximity to each other, and thus the magnetism detection value (detected voltage value) exceeds the threshold value and the magnetic sensor 316a outputs the L signal ('ON' signal). The control unit of the image pickup apparatus 101 acquires the L signal ('ON' signal) from the magnetic sensor 316a, and controls the light emitting part 116 of the light emission unit 301 to be in the non-light-emissive state based on the signal. Thus, even if a photographer performs a full-pressing operation of the release button 115, the light emitting part 116 does not radiate strobe light. In this state, if the photographer presses down the strobe lever 106 (see FIG. 1A), an arm of the strobe lever 106, which is not illustrated, slides with the slope 319a of the strobe engagement member 319 (see FIG. 3). By moving in the direction in which engagement with the engagement reception part 303e (see FIG. 3) of the light-emitting-part holder 303 is released, the strobe engagement member 319 is disengaged from the engagement reception part 303e. Due to the urging force of the first spring 310 and the second spring 317, the arm part 306 rotates about the second rotation shaft 318, and the light emission unit 301 rotates about the first rotation shaft 311 to be in the light emission position.

FIG. 5A illustrates a state in which the entire light emission unit 301 is exposed from the device body part of the image pickup apparatus 101. At this time, as the light emission unit 301 moves from the housing position to the light emission position, the distance between the magnet 309 and the magnetic sensor 316a is gradually lengthened. For this reason, a detection value of the magnetic sensor 316a becomes lower as the light emission unit 301 moves from the housing position to the light emission position. Specifically, since the detection value of the magnetic sensor 316a is equal to or lower than the threshold value in the state of FIG. 5B, the magnetic sensor 316a outputs the H signal ('OFF' signal). The control unit of the image pickup apparatus 101 acquires the H signal ('OFF' signal) from the magnetic sensor 316a, and controls the light emitting part 116 of the light emission unit 301 to be in the light emissive state based on the signal. Thus, if the photographer performs a full-pressing operation of the release button 115, the light emitting part 116 radiates strobe light as necessary.

As the light emitting part 116 is controlled to be in the light emissive state under the situation illustrated in FIG. 5B, even when the photographer deliberately stops the pop-up operation of the strobe unit 107, strobe light having high energy density is not radiated to the inside of the body part of the image pickup apparatus 101. Thus, "burning" does not occur in the image pickup apparatus 101. In addition, since the strobe unit 107 is provided with the link mechanism, a light distribution angle of the light emitting part 116 is linked to a rotation angle of the arm part 306. Thus, the photographer is not able to cause only the light emission unit 301 that is in the light emissive state to rotate about the first rotation shaft 311. In other words, it is not possible to deliberately cause strobe light to be radiated toward the device body part of the image pickup apparatus 101.

In the pop-up state illustrated in FIG. 6B, as a part of the arm member 307 comes in contact with a stopper face part 315f of the strobe base 315, rotation of the arm part 306 in the urging direction by the second spring 317 is regulated. In addition, as a part of the light-emitting-part holder 303 comes in contact with a screw fastening part 307e of the arm member 307, rotation of the light-emitting-part holder 303 in the urging direction by the first spring 310 is regulated. In this manner, the light emission unit 301 is held in the light emission position shown in FIG. 6B. In the light emission position, the distance between the magnet 309 and the magnetic sensor 316a becomes the longest. Since a detection value of the magnetic sensor 316a becomes equal to or lower than the threshold value, the magnetic sensor 316a outputs the H signal ('OFF' signal). The control unit of the image pickup apparatus 101 controls the light emitting part 116 of the light emission unit 301 to be in the light emissive state based on the H signal ('OFF' signal) from the magnetic sensor 316a. Thus, in the same manner as in the case of FIG. 5B, when the photographer performs a full-pressing operation of the release button 115, the light emitting part 116 radiates strobe light as necessary.

When the photographer presses the light-emitting-part cover 304 of the light emission unit 301 in the state in which the light emission unit 301 pops up to the light emission position, the light emission unit 301 moves substantially in parallel, resisting the urging force of the first spring 310. At the same time, the arm part 306 rotates about the second rotation shaft 318 in the housing direction, resisting the urging force of the second spring 317. Then, if the photographer pushes the light-emitting-part cover 304 again, the strobe engagement member 319 that has been slidably incorporated into the strobe base 315 is engaged with the engagement reception part 303e of the light-emitting-part holder 303. Accordingly, the light emission unit 301 is held in the housing position (See FIGS. 4A and 4B).

Figure 7:
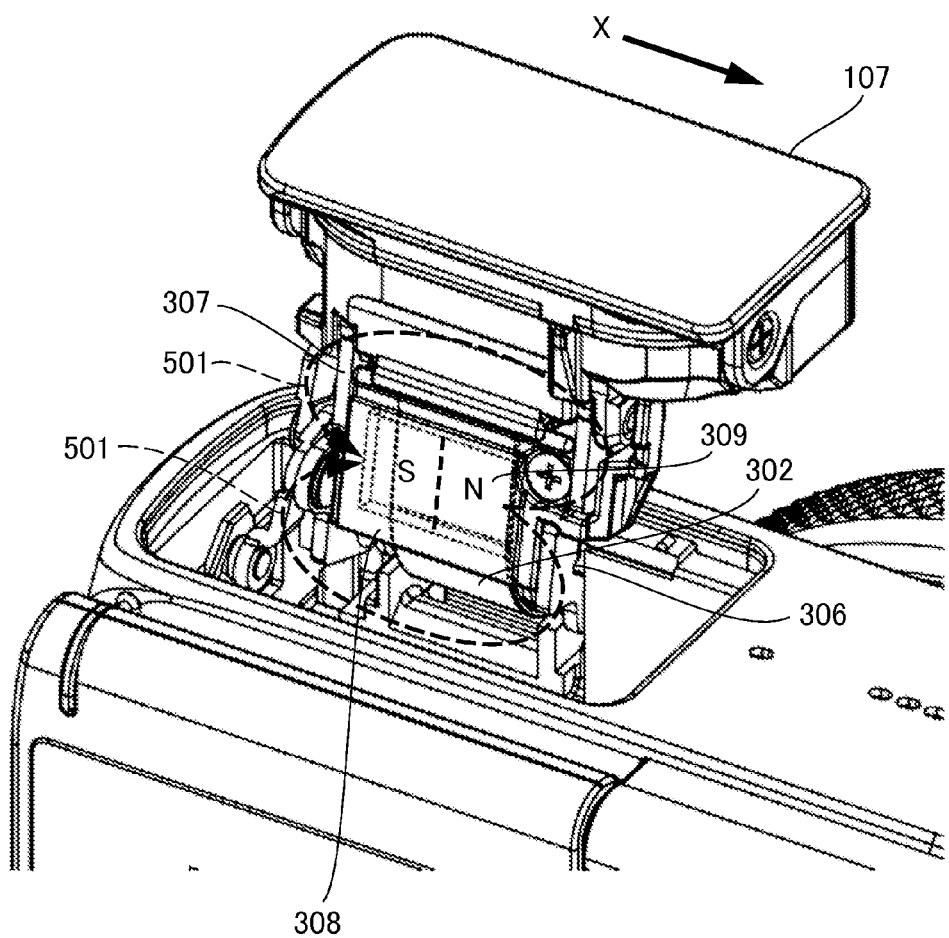
FIG. 7 is a perspective view illustrating the strobe unit at the light emission position from the back side according to the embodiment.

FIG. 7 is a perspective view from the back side showing the state in which the strobe unit 107 has popped up in the light emission position shown in FIG. 6B. The magnet 309 of the arm part 306 in the strobe unit 107 is disposed such that the magnet overlaps the light-emitting-unit flexible board 302 in the axis direction of the second rotation shaft 318 when it is viewed from the width direction (X direction) of the light-emitting-part flexible board 302, i.e., from the direction orthogonal to the second rotation shaft 318. Thus, the magnet 309 can be formed to be as large as possible in comparison to a case in which the magnet 309 is disposed in parallel to the light-emitting-part flexible board 302. In addition, even when the magnet 309 is set to be large in accordance with the arm member 307, the size of the strobe unit 107 does not increase in the width direction (X direction) of the arm member 307. By forming the magnet 309 to be as large as possible, the detection value of the magnetic sensor 316a can be as high as possible in the housing state of the strobe unit 107. Alternatively, when the detection value of the magnetic sensor 316a is sufficient, the magnetic sensor 316a can be disposed farther away from the magnet 309. Thus, after the entire light emission unit 301 is exposed from the device body part of the image pickup apparatus 101, the detection value of the magnetic sensor 316a becomes equal to or lower than the predetermined threshold value. Since it is not possible to deliberately cause strobe light to be emitted before the entire light emission unit 301 is exposed from the device body unit of the image pickup apparatus 101, "burning" of the inside of the body of the image pickup apparatus 101 caused by strobe light can be prevented.

Further, a direction of lines of a magnetic field 501 of the magnet 309 is set to be the direction orthogonal to the direction in which the strobe unit 107 pops up (the N pole and the S pole are set in the X direction). By incorporating the magnet 309 into the arm cover member 308 to set the direction as indicated by the lines of the magnetic field 501 of FIG. 7, the direction of the lines of the magnetic field 501 to be input to the magnetic sensor 316a is not reversed due to the pop-up operation of the strobe unit 107. Thus, the positional relation between the magnet 309 and the magnetic sensor 316a can be set such that the lines of the magnetic field 501 of the magnet 309 can be detected with highest efficiency.

According to the present embodiment, in the pop-up-type strobe unit that uses the two rotation shafts, a distance between the magnet and the magnetic sensor can be shortened while the size of the magnet is set to be large. For this reason, after the strobe unit sufficiently pops up from the device body part, a detection signal of the magnetic sensor turns into an OFF signal, and the strobe unit switches to the light emissive state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-183950, filed Sep. 10, 2014, which is hereby incorporated by reference wherein in its entirety.

What is claimed is:

1. An image pickup apparatus that includes a light emission unit which holds a light emitting part and moves between a housing position at which the light emission unit is housed in a housing part formed in a base member and a light emission position at which the light emission unit projects from the housing part, the apparatus comprising:
   an arm member, one end of which is pivotally supported by the light emission unit and the other end of which is pivotally supported by the base member;
   a circuit board that is disposed inside the image pickup apparatus;
   a flexible wire member that connects the light emitting part and the circuit board;
   a holding member that holds a magnet and is fixed to the arm member;
   a magnetism detection unit that is provided inside the image pickup apparatus and detects magnetism of the magnet; and
   a control unit that controls light emission of the light emitting part based on an output of the magnetism detection unit,
   wherein the holding member is fixed to a surface facing the housing part in a case where the arm member is housed in the housing part, and
   wherein a part of the flexible wire member is disposed between the magnet held by the holding member and the arm member.

2. The image pickup apparatus according to claim 1, wherein the magnetism detection unit is mounted on the circuit board,
   wherein, in a case where the output of the magnetism detection unit is equal to or lower than a threshold value, the control unit causes the light emitting part to emit light, and
   wherein, in a case where the output of the magnetism detection unit exceeds the threshold value, the control unit controls the light emitting part not to emit light.

3. The image pickup apparatus according to claim 1, wherein the arm member is formed of a soft magnetic material, and
   wherein the holding member and the housing part are formed of a synthetic resin material.

* * * * *